United States Patent [19]
Molz et al.

[11] Patent Number: 6,082,484
[45] Date of Patent: Jul. 4, 2000

[54] ACOUSTIC BODY WAVE DAMPENER

[75] Inventors: Eric Molz; Vladimir Dubinsky; James E. Leggett, III, all of Houston, Tex.

[73] Assignee: Baker Hughes Incorporated, Houston, Tex.

[21] Appl. No.: 09/201,988

[22] Filed: Dec. 1, 1998

[51] Int. Cl.[7] .................................................. G01V 1/00
[52] U.S. Cl. ...................... 181/102; 181/104; 181/106
[58] Field of Search .................................. 181/102, 104, 181/106; 367/83, 86

[56] References Cited

U.S. PATENT DOCUMENTS

| | | | |
|---|---|---|---|
| 5,510,582 | 4/1996 | Birchak et al. | 181/104 |
| 5,592,438 | 1/1997 | Rorden et al. | 367/83 |
| 5,852,262 | 12/1998 | Gill et al. | 181/106 |

*Primary Examiner*—Khanh Dang
*Attorney, Agent, or Firm*—Madan, Mossman & Sriram P.C.

[57] ABSTRACT

An acoustic attenuator suppresses acoustic signals traveling along the body of a measurement-while-drilling (MWD) tool, making it possible to obtain acoustic measurements relating to underground formations. Shaped cavities (spherical or cylindrical) filled with a fluid have a resonance frequency that is tuned to be within the band of interest thereby attenuating acoustic signals traveling through the body at these resonance frequencies. The staggered arrangement of the cavities increases the path length for the acoustic signals and provides further attenuation. Attenuation may also be accomplished by use of a composite consisting of cylindrical layers of two different materials with thicknesses that attenuate selected frequencies. Additional attenuation is provided by lengthening the path length of a seismic signal passing through the more competent of the two materials of the composite.

30 Claims, 6 Drawing Sheets

ACOUSTIC BODY WAVE DAMPENER

BACKGROUND OF THE INVENTION

1. Field of the Invention

This invention relates to an acoustic attenuator for attenuating acoustic waves traveling along a well tool and to a method of using such a tool to attenuate acoustic waves.

2. Background of the Art

In hydrocarbon exploration, acoustic logs are commonly run to obtain the speed of propagation of sound in the formations surrounding a borehole. Of particular interest is obtaining acoustic logs during the process of drilling, i.e., "measurements-while-drilling", known as MWD measurements. MWD measurements are now routinely obtained of neutron scattering, gamma ray scattering and electrical resistivity of underground formations. However, obtaining MWD acoustic logs has not been as successful due to the poor signal to noise ratio of acoustic log signals.

Acoustic logs are obtained by using a transmitter to generate an acoustic signal in the borehole and using a receiver at some distance from the transmitter to measure a received signal. Both the transmitter and the receiver are located on a drilling collar in proximity to the drilling tool. The borehole is filled with a drilling mud to facilitate the drilling process. The received signal consists of many components, the one of most interest being a component that travels through the borehole fluid into the formation, then as an acoustic wave in the formation to a point near the receiver from whence it travels as to the receiver in the borehole fluid. In addition to this desired signal, the transmitter itself excites a number of other types of signals that are received by the receiver, including borehole waves, tube waves and direct signals through the tool body.

The term acoustic as used herein is intended to include all types of elastic waves, including sound waves through fluids and compressional and shear waves in solids. The velocity of sound through fluids used in well bores is approximately 5,000 feet per second. On the other hand, the velocity of compressional waves through earth formations typically ranges from 4,500 ft/s (for porous sandstones with low gas saturation) to about 22,000 ft/s for nonporous carbonate rocks. By way of comparison, metals can have compressional wave velocities ranging between 13,000 and 20,000 feet per second. The velocity of borehole waves (tube waves, Stoneley waves, etc.) is somewhat less than the velocity of compressional waves in the formation.

Since the speed of propagation of compressional waves in the tool body, which is normally steel, is commonly much higher than that of the formation rock, the tool signal arrival usually occurs before the formation arrival. As an acoustic tool merely records signals as they are obtained, the tool has no way of distinguishing whether a signal has traversed the formation or the tool body. Thus, such a first arriving signal propagated along the tool body may be confused as the first arriving signal traversing the formation. In addition, in an MWD environment, the drillbit itself acts as a signal source that sends out signals that may be much stronger than the signal generated by the transmitter in the acoustic tool: the transmitter signal maybe swamped by the drillbit signal.

In wireline applications, the problems caused be signals originating at the drilibit are not present. Additionally, the tool is not required to function as a load bearing member so that it has been possible to form an array of staggered openings through the width of the sidewall of the tool's housing. These openings serve to lengthen the total path length that an acoustic signal propagated through the housing must traverse so that the signal across an extremely broad range of frequencies is not only delayed in its transit of the array of holes, but is also attenuated as a result of the increased path length and the signal scattering caused by the openings.

In MWD applications, making cuts that extend through the side wall thickness of the acoustic well tool is clearly unsatisfactory because an acoustic tool that is incorporated into the drill collar and must be able to withstand the immense forces and accelerations encountered during the drilling of the well. A large numbers of perforations through the side wall of the drill collar would weaken the collar so that it would no longer be able to withstand normal wear and tear of drilling. In addition, in MWD applications, drilling fluid is conveyed from the surface to the drillbit under pressure on the inside of the drill collar and the returning fluid from the drillbit to the surface travels on the outside of the drill collar. The return fluid carries with it cuttings from the bottom of the hole. Making holes through the drill collar means that an additional internal tubing would be required to carry the drilling fluid down from the surface.

U.S. Pat. No. 5,510,582 discloses a device in which an acoustic attenuation section is positioned between the transmitter and the receiver of the acoustic well tool. This acoustical attenuation section generally includes one or more cavities in the acoustic well tool, into which are inserted inertial masses. The cavities are generally shaped to receive the inertial masses and are slightly larger so that a gap will exists between the walls of the cavities and the inertial masses as the inertial mass is positioned in the cavity. Residing in the gap is an attenuation fluid. An o-ring seal keeps the fluid within the cavity. A locking cap member serves to keep the inertial mass positioned within the cavity. As noted in the patent, the results showed that merely cutting slots or firmly securing fillers in the slots gave smaller attenuation than using slots with inertial masses surrounded by an attenuation fluid in a gap of proper thickness for the frequency and fluid viscosity. The arrangement disclosed in U.S. Pat. No. 5,510,582 is rather complicated, making it difficult to machine. In addition, close tolerances in the machining are required in order to maintain the fluid gap between the inertial masses and the walls of the cavity. A supply of the inertial masses needs to be kept available, and changing the inertial masses would require considerable time, including possibly down time of a rig.

Gas bubbles in fluids are known to cause a significant attenuation of ultrasound. As the sound wave passes, the acoustic energy is dissipated in excited resonance bubbles and is thus lost. The sound wave continues to propagate with reduced energy while the bubbles continue to oscillate until viscous damping stops the oscillation. There are several conditions for such a resonance bubble. The compressibility of the gas bubble must be much greater than the compressibility of the surrounding fluid. The wavelengths of the ultrasound must be much larger than the diameter of the bubble. The surrounding fluid must deform in response to deformation in the gas bubble.

In principle, liquid bubbles in solid steel could also be used to dampen waves propagating in the steel as the conditions noted above are met. Such a device would be mechanically robust and simple. One embodiment of the present invention is based upon this principle.

SUMMARY OF THE INVENTION

The present invention is an apparatus and a method for attenuation of acoustic signals traveling between the transmitter and a receiver in an acoustic MWD device. The invention is a section of a drill collar that has a plurality of shaped cavities filled with oil. The passage of an acoustic wave sets up a resonance of the fluid in the shaped cavity. The frequency of resonance depends upon the shape and size of the cavity and the properties of the fluid in the cavity. In one embodiment of the invention, the cavities are spherical. Another embodiment of the invention uses cylindrical cavities with a piston restrained by a spring within the cavity. Changing the spring constant provides additional control over the frequencies that are attenuated. Yet another embodiment of the invention uses segmented isolators in which the drill collar section is filled with layers of a composite material in which the layers have a different density. The thicknesses of the individual layers is selected to attenuate certain frequencies.

BRIEF DESCRIPTION OF THE DRAWINGS

For a detailed understanding of the present invention, reference should be made to the following detailed description of the preferred embodiment, taken in conjunction with the accompanying drawings, in which like elements have been given like numerals, wherein.

DETAILED DESCRIPTION OF PREFERRED EMBODIMENTS

The various concepts of the present invention will be described in reference to FIGS. 1–7(a–c) which show schematic illustrations of embodiments of the device of the present invention.

Figure 1:
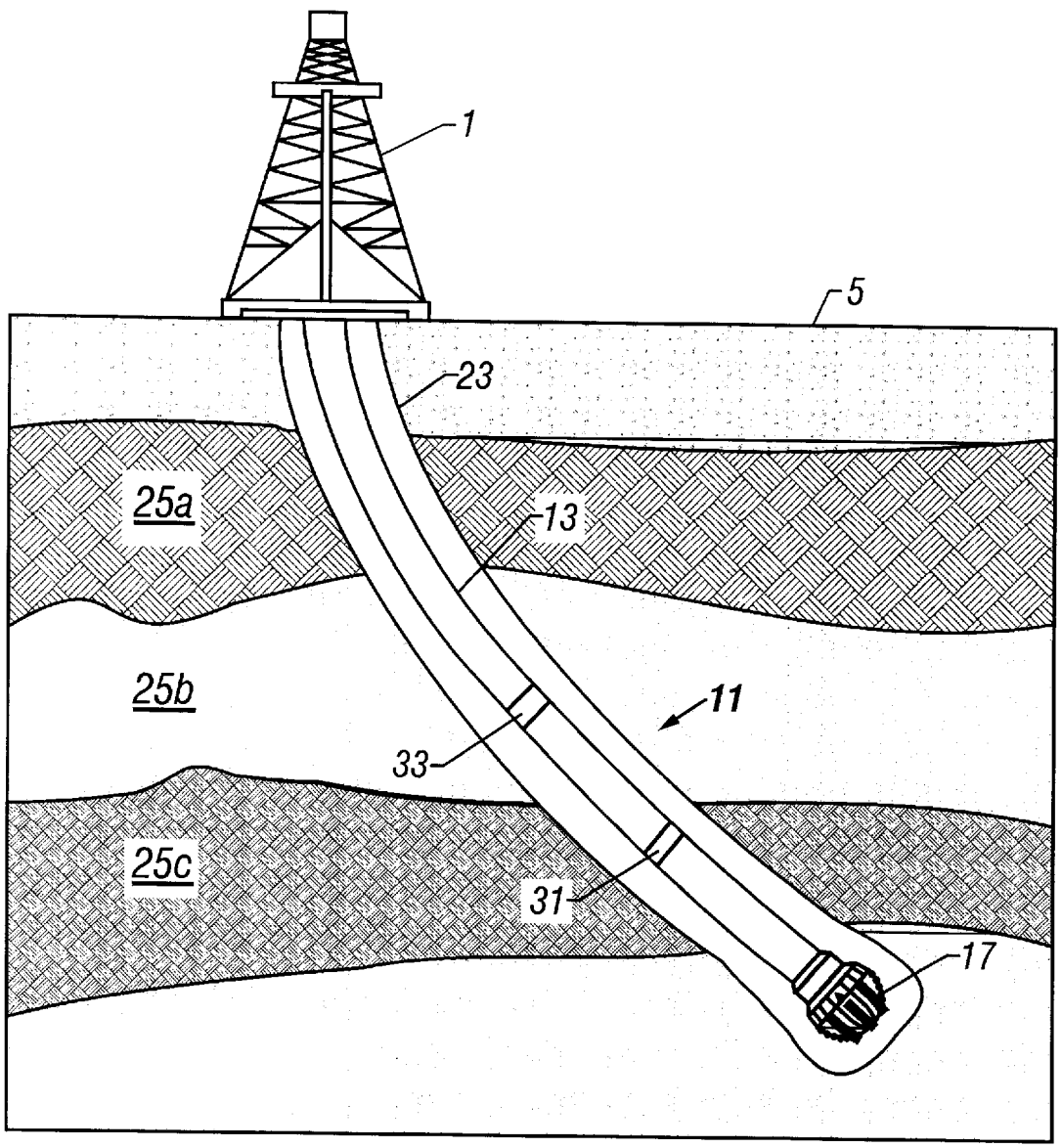
FIG. 1 shows a schematic illustration of a Measurement-While-Drilling apparatus for obtaining measurements relating to subsurface formations.

FIG. 1 is a schematic illustration of the use of a Measurement-While-Drilling (MWD) apparatus while drilling a well. At the surface of the earth 5a a drilling rig 1 is used to drill a borehole 23 through subterranean formations 25a, 25b, 25c etc. Those versed in the art would know that a drillship or a platform could be used to drill a borehole into subterranean formations covered by a body of water. A drilling tubular 13, that could be made of drill pipes or coiled tubing is used to rotate a drillbit 17 at the bottom, the rotating action of the drillbit and axial pressure carving out the borehole. When coiled tubing is used for the drilling tubular, a drilling motor (not shown) is used to impart the necessary rotary motion to the drillbit.

A variety of transducers are used downhole in a sensor assembly 11. This sensor assembly makes measurements of properties of the formations through which the borehole is being drilled. These could include electromagnetic, gamma ray, density, nuclear-magnetic resonance, and acoustic sensors. For illustrative purposes only, an acoustic transmitter array 31 and an acoustic receiver array 33 are indicated. Those versed in the art would recognize that other configurations of the acoustic transmitters and receivers could be used.

Figure 2:
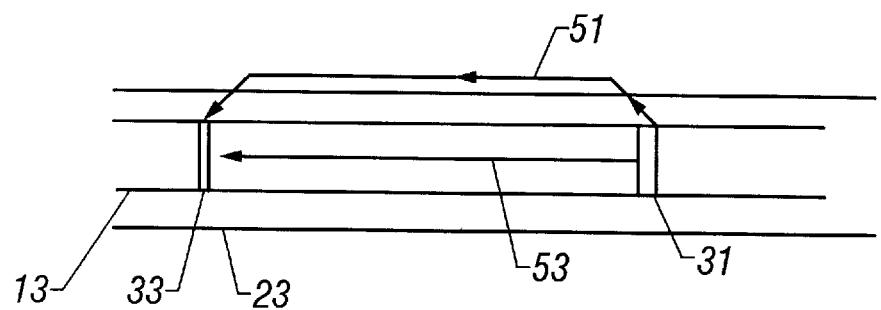
FIG. 2 shows an acoustic tool in a borehole and some of the raypaths taken by acoustic signals.

Turning now to FIG. 2, the transmitter 31 and the receiver 33 are shown inside the borehole 23. The annulus between the drilling tubular 13 and the borehole 23 is filled with a drilling fluid. The fluid is conveyed down the borehole inside the drilling tubular to the drillbit and returns up the hole via the annulus. Excitation of the transmitter produces acoustic signals. A portion of the signal, denoted by the raypath 53, is referred to as the direct arrival and travels through the tool to the receiver. The transmitter also produces an acoustic signal in the borehole fluid that enters into the formation. One portion of it, illustrated by the raypath 51 travels as a body wave through the formation and carries information about the formation that it traverses. The receiver also detects other signals, such as tube waves that involve a coupled wave between the fluid and the formation, Stoneley waves that are surface waves in the fluid, and signals reflected from acoustic reflectors within the formation.

In an MWD tool, as in wireline tools, the body wave 51 through the formation usually arrives before the tube wave and the Stoneley wave. However, in an MWD tool, the direct arrival 53 through the tool commonly arrives before the desired signal component 51 that carries information about the acoustic properties of the formation. In addition, the drillbit 17 itself is continuously generating acoustic signals traveling through the drilling tubular 13. Consequently, it becomes very difficult to determine a travel time for the formation body wave 51.

Figure 3:
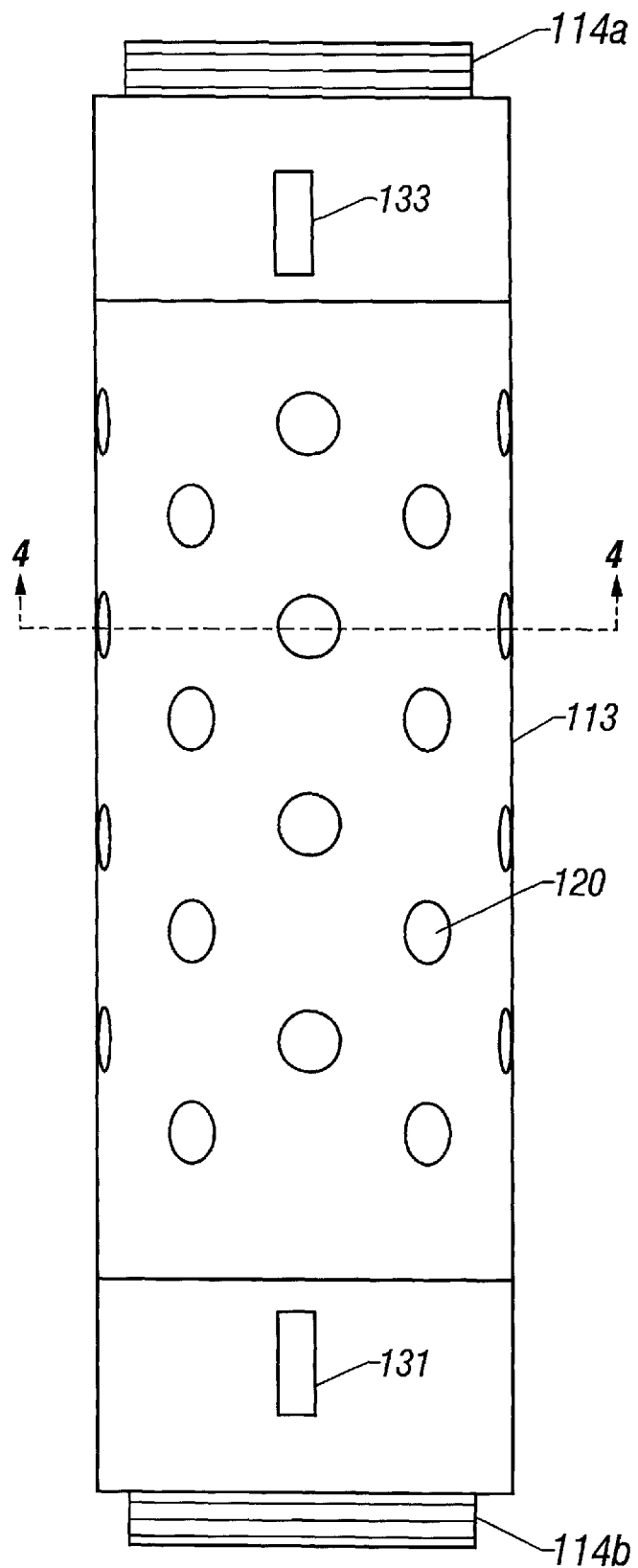
FIG. 3 shows an acoustic isolator incorporating a collar section with a number of cylindrical cavities.

FIG. 3 shows an embodiment of the absorption tool of the present invention. A collar section 113 is adapted to be coupled to the drilling tubular 13 by means of a suitable coupling arrangement such as a threaded connection 114a, 114b. Other known methods of coupling the collar section to the drilling tubular could also be used. An acoustic transmitter 31 generates acoustic signals that are received by receiver 133. For illustrative purposes, a single transmitter and a single receiver are shown: those versed in the art would recognize that a plurality of circumferentially disposed transmitters and receivers could be used and, in addition, multiple spaced apart arrays of such circumferential arrays could be used.

Figure 4:
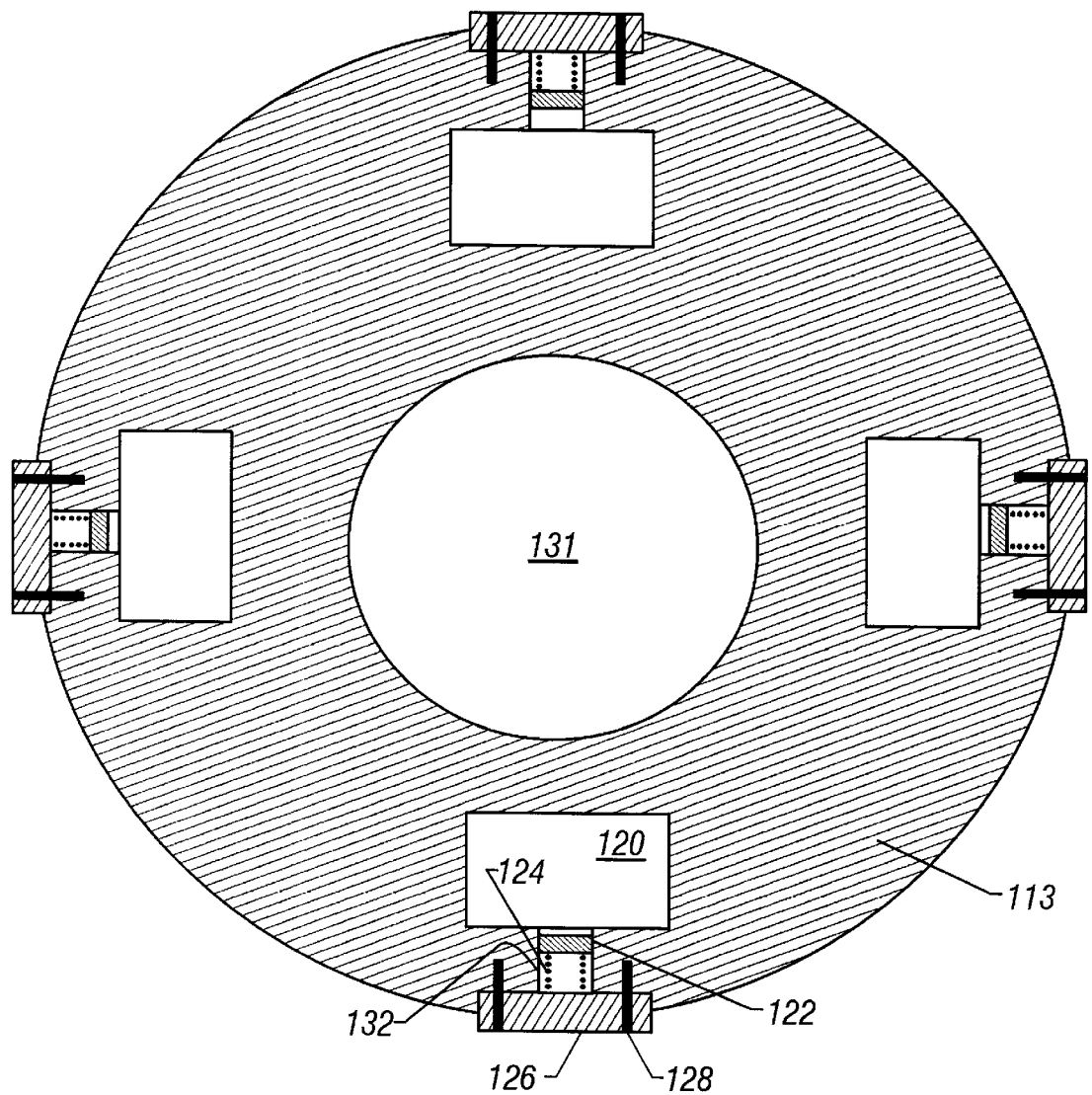
FIG. 4 shows a cross section of the isolator of FIG. 3.

Between the transmitter and the receiver are a number of cavities 120 that serve to attenuate the acoustic signal propagating along the tool. FIG. 4 shows a cross sectional view of the attenuator section. The collar section 113 is provided with a number of cylindrical resonance cavities 120. In a preferred embodiment, four cavities are used. Drilling fluid flows through the central opening 131. Each of the cavities 120 is filled with a fluid. The fluid in the cavity 120 is confined by means of a piston 122 and spring 124 arrangement in the side cavity 132. End clamp 126 held by means of bolts 128 keeps the spring-piston assembly in place.

Upon the passage of an acoustic wave through the attenuator, expansion and contraction of the fluid in the resonance cavity 120 takes up some of the energy in the acoustic wave. The piston 122 allows this movement of the fluid. By proper selection of the spring constant of the spring 124, the fluid and the size of the cavity, the resonance frequency of the cavity 120 can be adjusted to match the dominant frequency of the acoustic wave, thereby damping the acoustic wave in the collar section 113. The number of cavities is a tradeoff between increasing the number to provide for increased attenuation of the signal while, at the same time, keeping the number small enough so that the collar section 113 is not unduly weakened.

Referring back to FIG. 3, it can be seen that axially, the positions of the resonance cavities 120 are staggered. This has the effect of increasing the tortuosity and path length for an axially propagating acoustic signal.

Those versed in the arts would recognize that the resonance modes of a cylindrical cavity are somewhat complicated. The analysis of the resonance of a spherical cavity is much simpler and is given below in reference to the embodiment of FIG. 5.

Figure 5:
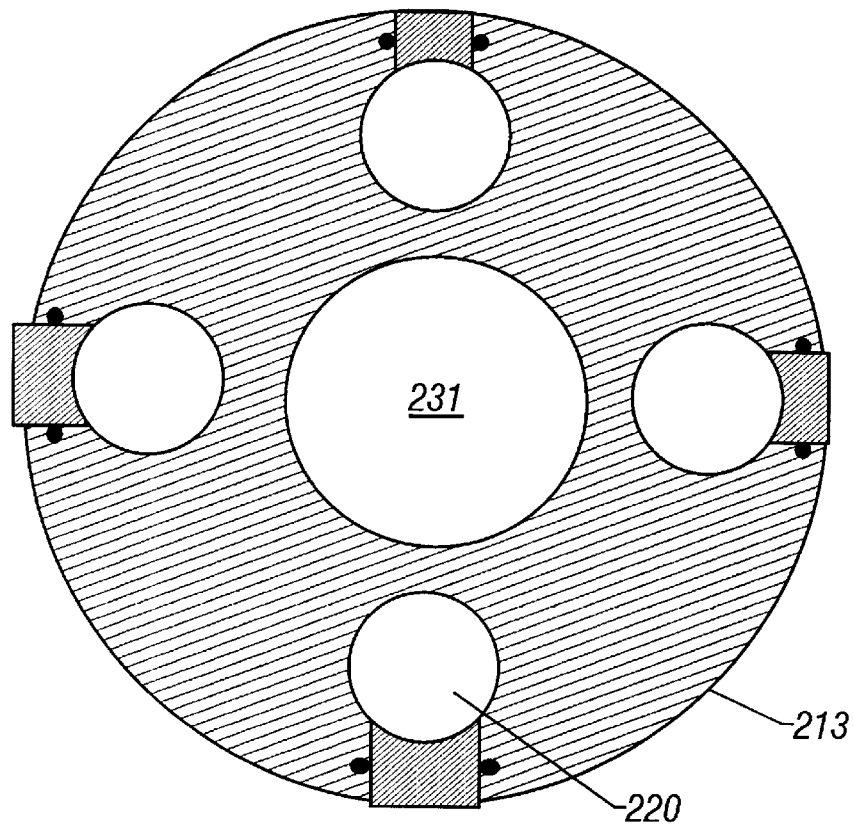
FIG. 5 shows an acoustic isolator incorporating a collar section with a number of cylindrical cavities.

FIG. 5 shows an alternate embodiment in which the attenuation is accomplished by a plurality of spherical resonance cavities 220 having a fluid therein. Four such cavities are shown in a cross-sectional view of the attenuator section 213. These cavities can be staggered in an axial direction in an arrangement similar to that shown in FIG. 3.

Figure 6:
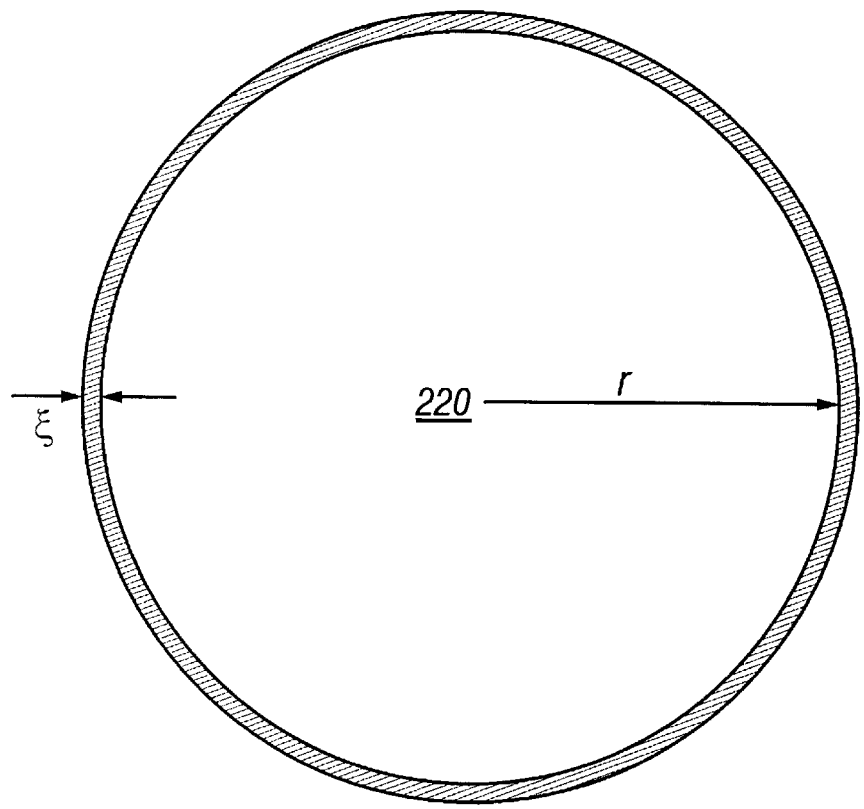
FIG. 6 shows the resonance behavior of a single spherical cavity.

The analysis of the resonance of a spherical cavity is discussed now with reference to FIG. 6. Shown is a spherical cavity of radius r. The liquid in the cavity has an inherent stiffness κ and a mass m. The resonant frequency ω for the fundamental mode is given by $$\omega = \left(\frac{\kappa}{m}\right)^{1/2} \qquad (1)$$

The stiffness is determined by the force F acting perpendicular to the outer surface of the liquid to displace the outer surface by a distance ξ

$$\kappa = \frac{F}{\xi} \qquad (2)$$

The force can be express in terms of the displacement of the outer surface. Consider that the change in the volume (ΔV/V) is related to the change in pressure P by $$\frac{\Delta V}{V} = \frac{P}{\beta} \qquad (3)$$

where β is the bulk modulus of the fluid. The volume change can the be expressed as $$\Delta \frac{V}{V} = \frac{4\pi r^2 \xi}{((4/3)\pi r^3)} = 3\xi/r \qquad (4)$$

The force in terms of displacement of the outer surface is thus $$F = 12\pi r \beta \xi \qquad (5)$$

The stiffness is $$\kappa = F/\xi = 12\pi r \beta \qquad (6)$$

There are two contributions to the system mass: the mass of the entrapped fluid and the radiation mass of the steel. The mass of the entrapped fluid is given by $(4/3)\pi r^3 \rho_f$. The radiation mass of the steel is treated as if it were a fluid and thus has three times the volume of chamber $(4/3)\pi r^3 \rho_s$. The mass contribution of the surrounding steel is much greater than that of the fluid. Ignoring the fluid term, the resonant frequency is given by $$\omega = (3\beta/\rho_s)^{1/2}/r \qquad 7$$

A bubble of diameter 1" filled with Dow Corning 200™ fluid (bulk modulus of $1.7 \times 10^9$ N/m²) in a steel collar with a density of 6800 kg/m³ would have a resonance frequency of 11 kHz, which is in the band of interest and can be changed by changing the system parameters (fluid modulus, chamber size).

By proper selection of the size of the spherical cavity, the resonance frequency can be easily made to lie between 6 kHz and 20 kHz. This range of frequencies would be sufficient to attenuate the undesired signals traveling through the tool. By having a number of cavities of different sizes, a corresponding number of different frequencies could be attenuated.

The resonance of a fluid in a cylindrical cavity is somewhat more complicated than the resonance of a spherical cavity but can be carried out using known techniques to give a resonant frequency for a wave traveling perpendicular to the axis of the cylinder, this being the preferred configuration of the cavities in FIGS. 3 and 4.

Figure 7A:
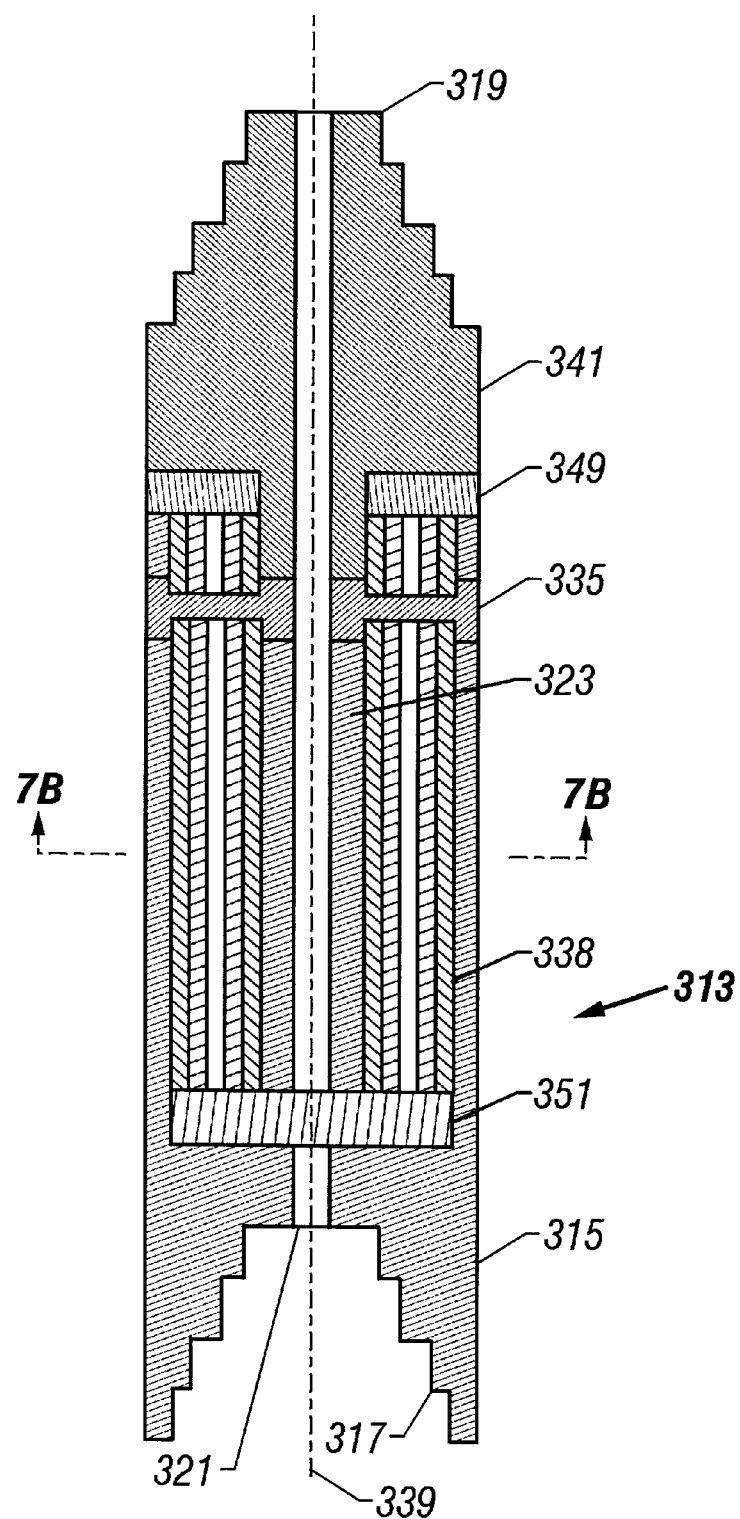
FIGS. 7a–7c illustrate an acoustic isolator made up of a number of layers of a composite.
Figure 7B:
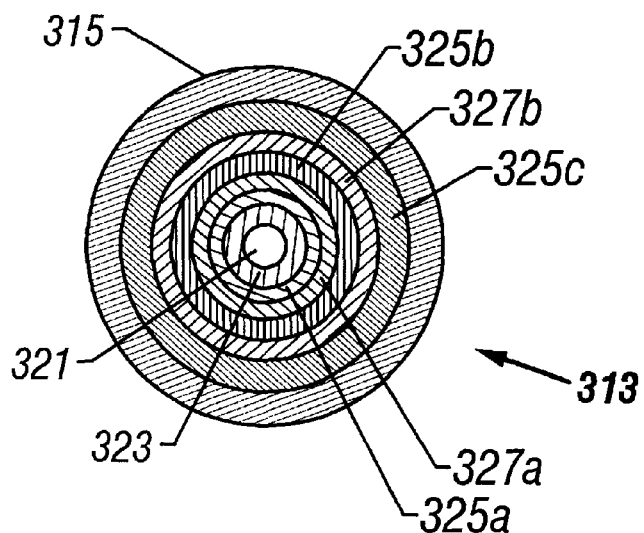

Turning now to FIGS. 7a and 7b, another embodiment of the invention for dampening of acoustic body waves is illustrated. Shown is a single section 313 of the attenuator, the individual sections being adapted to be coupled end to end to each other and/or to segments of the drilling tubular by means of couplings at ends 317 and 319. These could be screw couplings, latch couplings or other types of couplings known to those versed in the art.

Figure 7C:
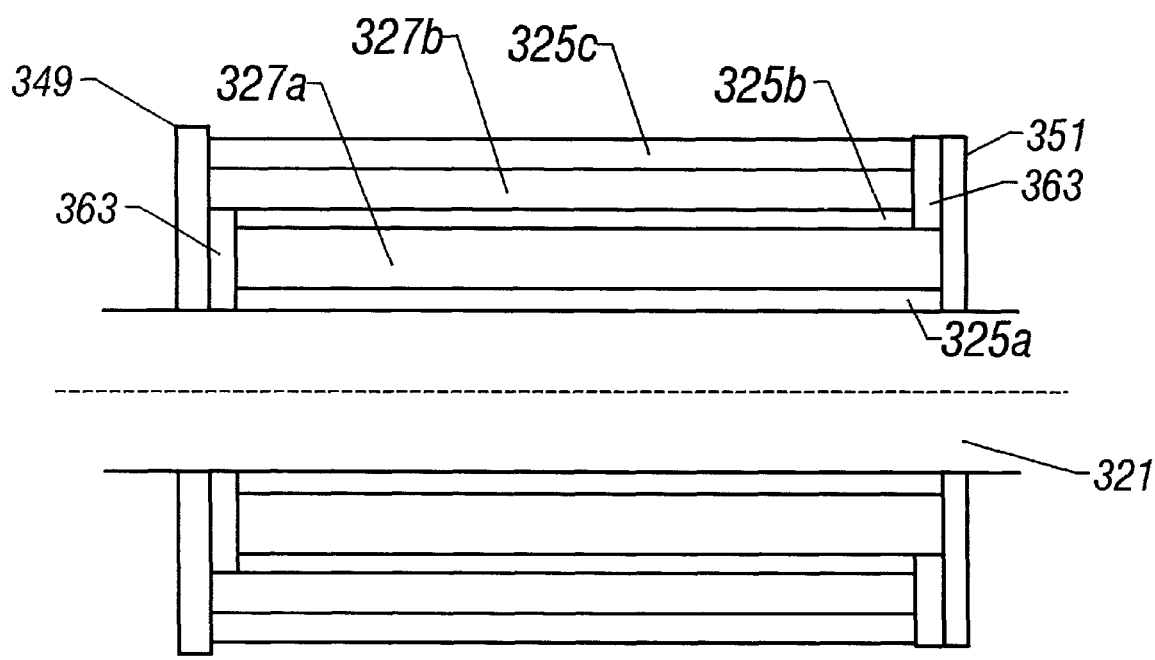

The attenuator section 313 includes a cylindrical body 313 with openings at both ends. At one end 317 it may be coupled to other sections or to the tubular housing (not shown). The cylindrical body has a cylindrical cavity 338 filled with a composite material. For illustrative purposes, the individual layers of the composite are schematically shown as 325a, 327a, 325b, 327b, 325c etc. In closest to the axis 339 of the cylindrical body 315 is an inner core 323 that, outside the cylindrical body 315 widens into an end section 341 that is shaped for coupling with other attenuator sections or with drilling tubulars. The space between the cylindrical body 315 and the end section 341, denoted here by 349 is filled with an elastomeric spacer and bonded by epoxy to the cylindrical body 315 and the end section 341 by epoxy. A spacer 351 is also provided at the lower end of the cylindrical body 315, FIG. 7C illustrates the arrangement of the layers of the composite. For illustrative purposes, only layers 325a, 327a, 325b, 327b and 325c are shown. Spacers 349 and 351 isolate this section from the rest of the downhole equipment. The layers 325a–c are made of metal and at opposite ends of the tool, are provided with metal washers 361, 363. These washers provide a continuous and tortuous path for acoustic signals propagating axially along the tool. Because of the tortuous path alone, there is an increased attenuation of acoustic signals propagating axially along the tool. In addition, the thicknesses of the layers 325a, 327a, 325b, 327b and 325c are selected so that they correspond to appropriate multiples of a quarter wavelength of a frequency of the acoustic signal. This quarter wavelength tuning, which can be done for one or more frequencies in the band of interest, leads to the well-known phenomenon of suppression of the signal due to reflection of the signal at the interfaces between the cylinders. The elastomeric material, due to its different acoustic velocity, has a different wavelength than the metal layers 325a–c. By proper selection of the layer thicknesses, a number of different frequencies may be suppressed.

The individual layers of the composite section are made of materials with two different densities and tightly bonded together by epoxy. For example, the layers could be of plastic and steel or of tungsten and steel. In another embodiment of the invention, the layers could be steel and epoxy. The inner core 323 is not directly in contact with the cylindrical body 315. The layers of composite materials in the cavity 338 together with the cylindrical body 315 are mechanically strong enough to carry the drilling load. However, due to the mechanical isolation of the inner core from the outer cylinder, there is no direct path for the propagation of high frequency acoustic signals.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for performing acoustic investigations of subsurface geological formations penetrated by a borehole, comprising:
   (a) a longitudinally extending body for positioning in said borehole;
   (b) an acoustic transmitter supported by the body for generating acoustic signals in the body, the borehole and the subsurface formations;
   (c) an acoustic receiver supported by the body for receiving acoustic signals;
   (d) an acoustic attenuation section positioned on the body between the transmitter and the receiver, said acoustic attenuation section including at least one shaped cavity substantially completely filled by a fluid, said at least one fluid filled cavity adapted to resonate at at least one resonance frequency in response to passage of said acoustic signals through the body.

2. The apparatus of claim 1 wherein the at least one shaped cavity is substantially spherical.

3. The apparatus of claim 1 wherein the at least one cavity comprises a plurality of substantially spherical cavities having a single radius, said single radius selected to give a value for the at least one resonance frequency between 6 kHz and 20 kHz.

4. The apparatus of claim 1 wherein the at least one cavity comprises a plurality of substantially spherical cavities each having a radius, each said radius selected to give a value for the at least one resonance frequency between 6 kHz and 20 kHz.

5. The apparatus of claim 1 wherein the at least one cavity comprises a plurality of cavities circumferentially disposed about a longitudinal axis of the body.

6. The apparatus of claim 1 wherein the at least one cavity comprises a plurality of axially separated sets of cavities, said cavities in each said axially separated set of cavities being circumferentially disposed about a longitudinal axis of the body and circumferentially offset from the cavities of an adjacent set of cavities.

7. The apparatus of claim 1 wherein the at least one shaped cavity is substantially cylindrically shaped and has an opening to an outside surface of the tool body, the opening having a piston and a spring therein to adjust a resonance frequency of the at least one shaped cavity.

8. An acoustic attenuator for use with a drilling tubular in Measurement-while-drilling (MWD) apparatus for attenuation of acoustic signals, said attenuator comprising:
   (a) a collar section adapted to be coupled to the drilling tubular; and
   (b) a body including at least one shaped cavity substantially completely filled by a fluid, said at least one fluid filled cavity adapted to resonate at at least one resonance frequency in response to passage of said acoustic signals through the attenuator thereby attenuating the acoustic signals passing through the body at said resonance frequency.

9. The acoustic attenuator of claim 8 wherein the at least one shaped cavity is substantially spherical.

10. The acoustic attenuator of claim 8 wherein the at least one cavity comprises a plurality of substantially spherical cavities having a single radius, said single radius selected to give a value for the at least one resonance frequency between 6 kHz and 20 kHz.

11. The acoustic attenuator of claim 8 wherein the at least one cavity comprises a plurality of substantially spherical cavities each having a radius, each said radius selected to give a value for the at least one resonance frequency between 6 kHz and 20 kHz.

12. The acoustic attenuator of claim 8 wherein the at least one cavity comprises a plurality of cavities circumferentially disposed about a longitudinal axis of the body.

13. The acoustic attenuator of claim 8 wherein the at least one cavity comprises a plurality of sets of cavities, said cavities in each set of cavities being circumferentially disposed about a longitudinal axis of the body and circumferentially offset from the cavities of an adjacent set of cavities.

14. The acoustic attenuator of claim 8 wherein the at least one shaped cavity is substantially cylindrically shaped and has an opening to an outside surface of the tool body, the opening having a piston and a spring therein to adjust the resonant frequency of the at least one shaped cavity.

15. An acoustic attenuator for use with a drilling tubular for attenuation of an acoustic signal in the tubular, the attenuator comprising:
   (a) a substantially cylindrical body adapted to be coupled to the drilling tubular;
   (b) a substantially cylindrical cavity in the body, said cylindrical cavity containing a composite material including a plurality of layers of at least two different materials, said composite material arranged to lengthen the path of the acoustic signal through the body; and
   (c) an axial bore in the composite material for passage of a drilling fluid.

16. The attenuator of claim 15 wherein each of the plurality of layers is cylindrically shaped.

17. The attenuator of claim 16 wherein one of the at least two different materials is a metal.

18. The attenuator of claim 15 wherein one of the at least two different materials is an elastomer.

19. The attenuator of claim 17 wherein the plurality of layers comprises at least two spaced apart cylindrical layers of metal, the attenuator further comprising a washer in contact with the at least two layers of metal, said washer providing the lengthened path for the acoustic signals through the at least two layers of metal.

20. The attenuator of claim 15 wherein the acoustic signal has a frequency and wherein at least one of the plurality of layers has a thickness selected to attenuate the acoustic signal at said frequency.

21. A method for performing acoustic investigations of subsurface geological formations penetrated by a borehole, comprising:
   (a) positioning an acoustic logging apparatus having a longitudinally extending body in the borehole;
   (b) using an acoustic transmitter supported by the body for generating acoustic signals in the body, the borehole and the subsurface formations;
   (c) using an acoustic receiver supported by the body to receive acoustic signals propagating in the body, the borehole and the subsurface formations; and (d) attenuating the acoustic signals in the body by using an acoustic attenuation section positioned on the body between the transmitter and the receiver, said acoustic attenuation section including at least one shaped cavity substantially completely filled by a fluid.

22. The method of claim 21 wherein the at least one shaped cavity is substantially spherical.

23. The method of claim 21 wherein the at least one shaped cavity is substantially cylindrically shaped and has an opening to an outside surface of the tool body, the method further comprising using a piston and a spring in the opening to adjust a resonant frequency of the at least one shaped cavity.

24. The method of claim 21 wherein the acoustic signals in the body have a frequency and the shaped cavity has a resonance frequency matched to said frequency of the signals.

25. A method of attenuating acoustic signals in the body of a Measurement-while-drilling (MWD) apparatus, said method comprising passing said acoustic signals through an attenuator on the body of the MWD apparatus, the attenuator having at least one shaped cavity substantially completely filled by a fluid, said at least one fluid filled cavity adapted to resonate at at least one resonance frequency in response to passage of said acoustic signals through the attenuator.

26. The method of claim 25 wherein the at least one shaped cavity is substantially spherical.

27. The method of claim 25 wherein the at least one shaped cavity is substantially cylindrically shaped and has an opening to an outside surface of the tool body, the method further comprising using piston and a spring in the opening to adjust said at least one resonance frequency of the at least one shaped cavity.

28. A method of attenuating an acoustic signal in the body of a Measurement-while-drilling (MWD) apparatus, said method comprising:

(a) passing said acoustic signals through an attenuator on the body of the MWD apparatus, and (b) lengthening a path of the acoustic signal in the attenuator.

29. The method of claim 28 wherein the attenuator includes a composite material consisting of a plurality of layers of at least two materials, the lengthening of the path being accomplished by a washer in contact with two layers of one of the at least two materials.

30. The method of claim 28 further comprising selecting a thickness of at least one of the plurality of layers to be tuned to a wavelength of the acoustic signal.

* * * * *